March 4, 1969  E. T. BIASI ET AL  3,431,115
PROCESS FOR-MAKING BAKERS' CHEESE
Filed Jan. 21, 1966

CHEESE MOISTURE
VS
TEMP. OF OPERATION

INVENTORS.
EDWARD T. BIASI
JOHN G. SKIBIAK
BY
ATTORNEY 3,431,115
PROCESS FOR MAKING BAKERS' CHEESE
Edward T. Biasi and John G. Skibiak, Philadelphia, Pa., assignors to Pennsalt Chemicals Corporation, Philadelphia, Pa., a corporation of Pennsylvania
Filed Jan. 21, 1966, Ser. No. 522,153
U.S. Cl. 99—116    8 Claims
Int. Cl. A23c *19/02;* A01j *25/11, 25/00*

ABSTRACT OF THE DISCLOSURE

In a process for making bakers' cheese following formation of cheese curd and whey, the latter are heated in the range of between 95° and 160° F. depending upon the desired moisture content of the final cheese product, and then the curd and whey are centrifugally separated in a centrifuge having an axial screw conveyor, after which they are discharged from the centrifuge without any need for recirculation.

---

This invention relates to improvements in manufacture of bakers' cheese, that is cheese used by bakers in the making of cakes and pies, and relates to an improvement in that part of the cheese-making procedure which follows the making of the curd and includes the draining of the whey from the curd.

In the past in the production of bakers' cheese the skim milk having a fat level content of less than 0.7% has been delivered to a cheese-making tank or vat along with an appropriate starter and rennet. After a period of time, for instance 8 to 12 hours, the cheese forms, progress of the curd being measured by the pH of the mixture. Desirably the pH of the finished cheese is in the range of 4.5 to 5.0. From the cheese-making tank the cheese has been delivered into filter bags and allowed to drain to the desired moisture content, almost invariably below 75%. The draining time has been in the range of 2 to 24 hours. Finally the bags have been squeezed and the cheese removed and packaged.

Obviously there have been drawbacks in the process of the prior art. For one thing the time consumed in the draining operation has made this part of the procedure a "bottle neck" and has involved much hand labor and "man handling" in the hanging of the filter bags in the "slop" room. The labor required has, of course, involved concomitant personnel problems and expense. Flavor, keeping ability, and pH have all been adversely affected by the long draining of the cheese in bags. To arrest the development of greater acidity, the bags have been packed in cracked ice prior to the squeezing. In addition the "slop" room, a large tiled or concrete area has presented sanitation problems and has had to be hosed down frequently with both water and alkali solutions. On top of all these disadvantages there has been no adequate control of the moisture content of the cheese product.

It had been hopefully thought with the application of centrifugal apparatus to cheese manufacture as exemplified in the U.S. Patent 2,387,276 which issued on an application by Oscar J. Link that the disadvantages inherent in the old bakers' cheese process would be avoided by the use of an appropriate centrifuge. The application of various devices including that disclosed in the Link patent, however, was disappointing. The Link patent, it will be noted, deals with the manufacture of cream cheese. Centrifugally, cream cheese involves an entirely different separation problem from that presented by the bakers' cheese. With bakers' cheese the curd or cheese is heavier than the whey, while the opposite is true for cream cheese. Hence the use of an apparatus as in the Link patent on bakers' cheese has meant that the heavy solids have had to be brought inward through special discharge passages. This has invariably resulted in the plugging of the passages with cheese and the ultimate filling up of the entire centrifuge bowl with cheese, making separation impossible. Link, of course, was not faced with this problem since with cream cheese the whey, the heavier phase, moves inwardly through the passages without plugging, while the lighter cheese solids merely float out the bowl through an appropriate weir.

The application of the conventional nozzle centrifuge bowl to the bakers' cheese operation also resulted in disappointment. The bakers' cheese solids invariably plugged the peripheral nozzle of the nozzle centrifuge and here again the bowl filled up completely with cheese. The perforate basket centrifuge was similarly not suitable. Dejected, the bakers' cheese processors returned to their age old process of hanging the cheese mixture in bags for drainage with is concomitant disadvantages.

Under the present invention it is possible to centrifugally separate bakers' cheese from its whey and to thereby eliminate the disadvantages concomitant with the prior art processes. It is also possible by the means of the present invention to control accurately the moisture content of the final cheese product.

Other advantages of the invention will be apparent from the following specification including the drawings wherein.

Briefly, the invention involves a process for making bakers' cheese comprising the steps forming the cheese curd, heating it to a selected temperature and delivering it to a centrifuge having a boundary surface and a conveyor surface, and moving the solids with the conveyor surface to a solids discharge opening once the solids have settled on the boundary surface. As indicated the moisture content of the final cheese product can be accurately controlled by adjusting the temperature to which the cheese is raised prior to centrifuging.

Figure 1:
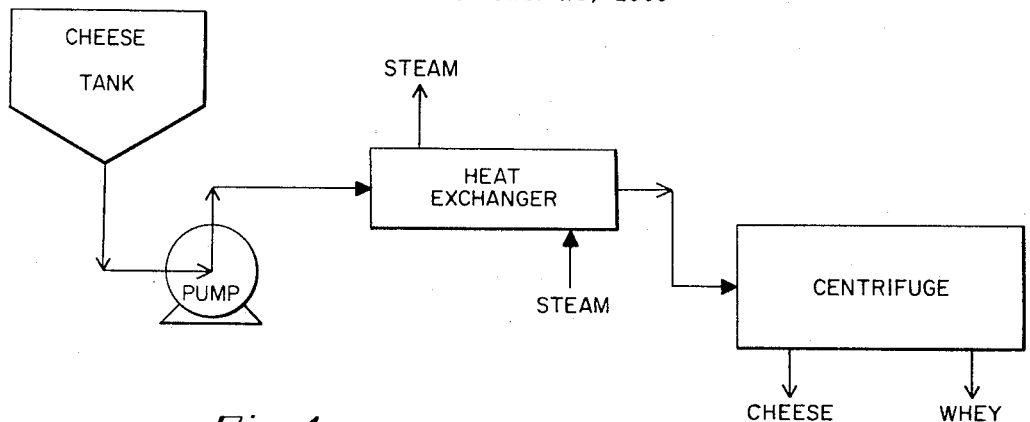
FIGURE 1 represents a flow diagram of a process embodying the invention.

Referring more specifically to FIGURE 1 of the drawings, at the commencement of the process skim milk having a fat level content below 0.7%, preferably in a range between 0.1 and 0.5%, is delivered to the cheese-making tank. Also delivered is an appropriate quantity of a bacteria culture for use as a starter and an appropriate enzyme such as rennet. As in the past the tank is maintained preferably at room temperature, say 72° F., for a period of 8 to 12 hours. When the cheese curd is properly formed, and this is detected by the mixture reaching an appropriate pH level such as 4.5 to 5.0, the cheese curd with its whey is pumped or delivered by gravity in a stream to a heat exchanger. In the heat exchanger the temperature of the mix is uniformly and rapidly raised to a selected temperature depending on a desired moisture content of the cheese product. Preferably the heat exchanger may be heated by steam as shown in the drawings, although other means of heating, such as gas and electricity, are contemplated. In order for the heating to be uniform, the heat exchanger can lead the flow of ripened mix for a considerable distance as through zig-zag passages or simply over a sizable length of delivery tube.

From the heat exchanger the stream of the heated cheese curd and its whey is delivered to a centrifuge of the type having a solid wall and an internal screw conveyor and having separate liquid and solid discharge ports. An appropriate type of centrifuge is disclosed in the U.S. Patent 3,148,145 which issued Sept. 8, 1964 on a patent application by Karl G. Reed. In such a centrifuge the heavier cheese solids settle against the boundary wall and the conveying surface of the conveyor screw which rotates at a different speed from the speed of the bowl moves the settled solids to the solids discharge port from which they are thrown outward and collected. These solids comprise the final cheese product. The whey on the other hand is discharged through a separate liquid discharge port at the opposite end of the centrifuge and is for disposal or further processing.

In some variations of the process the centrifuge used may be of the type disclosed in the previously mentioned Reed patent but arranged so that the solids discharge port is actually outward of the liquid discharge port as taught in the U.S. Patent 3,172,851 which issued Mar. 9, 1965 on an application by Charles M. Ambler. However, in most cases the more conventional positioning of liquid and solids discharge ports is effective.

Figure 2:
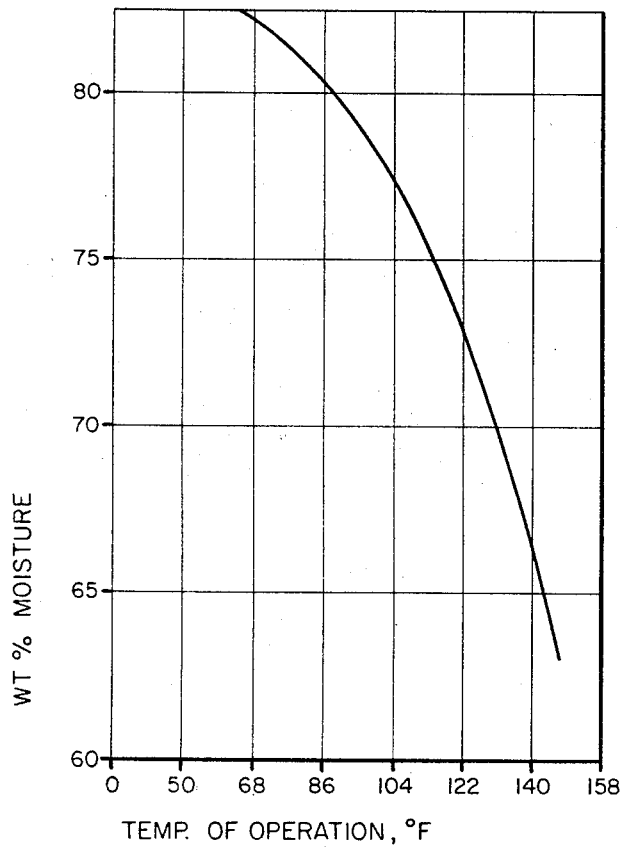
FIGURE 2 is a graph representing the reproducibility of the relationship between the moisture content of the final cheese product and the temperature to which the cheese is raised prior to centrifuging.

The reproducibility of moisture content of the solids discharge comprising the final cheese product in accordance with the selected control of temperature to which the cheese curd is raised prior to centrifuging is indicated in the graph comprising FIGURE 2 of the drawings. For most uses, bakers' cheese must have a moisture content of not higher than 75%. As indicated on the graph, for the particular cheese batch used, this involves in accordance with the present invention raising the temperature of the batch to at least about 110° F. It can be seen from the graph that if a dryer cheese of, for instance, a moisture content of 62% is desired, temperatures in the neighborhood of 145 to 150° would be appropriate. As indicated from the graph it was discovered that in order to achieve a product of an acceptable dryness it was necessary to raise the temperature of the cheese, and in not raising the temperature of the cheese at all prior to centrifuging, an adequate dryness could not be attained.

The exact reason why temperature before centrifuging is critical in the amount of moisture in the final cheese product is not known. However, it is believed that the protein solids coalesce and bind together to a greater extent as the temperature is raised. This binding makes the centrifuging more efficient.

It should be noted that the heat imparted to the cheese curd prior to centrifuging can be sufficient to pasteurize the cheese.

In an actual embodiment of the process of the invention the cheese curd at a temperature of 72° F. was externally heated to 148° F. by steam. At this temperature the stream was delivered to a P-2000 "Super-D-Canter" centrifuge operating at approximately 4800 r.p.m. and generating a centrifugal force of approximately 4500 times gravity. The differential speed of the conveyor in the "Super-D-Canter" was 3 r.p.m. The cheese which discharged through the solids discharge port was totally acceptable and of uniform quality, having a moisture content of 68% and a pH of 4.8.

Subsequently the temperature to which the mix was raised was reduced so that a thermometer on the discharge end of the heat exchanger indicated 122° F. The cheese product which discharged from the solids outlet of the centrifuge under these conditions had a moisture content of 74%, approximately the maximum moisture content which bakers using such cheese are able to accept.

From the above it can be seen that the present invention offers at least an accurate control of the moisture content of the discharged final cheese product. At the same time it affords a means for effectively replacing the age old method of draining the whey from the cheese in drain bags with concomitant shortcomings. It will be readily appreciated by those in the cheese-making art that the present process produces simply and economically with accuracy of control a cheese of uniform quality of the desired pH and moisture content without giving rise to the problems of time consumption, sanitation and impaired quality previously involved in the bag-draining techniques.

The present invention may be embodied in other specific forms without departing from the spirit or central attributes thereof and, accordingly, reference should be made to the appended claims rather than the foregoing specification as indicating the scope of the invention.

Considering in the preparation of this application were the following patents: 2,415,239; 2,574,508; 2,963,370; 3,148,145; 3,172,851; 2,982,654.

We claim:

1. A process for making bakers' cheese comprising the steps of preparing the cheese curd, heating a stream of the cheese curd with its whey to a temperature in the range of 95° to 160° F. depending on the moisture content desired in the final cheese product, delivering the stream continuously to a zone of centrifugation comprising a rotatable boundary surface formed about a rotational axis and having a solids outlet and a liquid outlet spaced therefrom and a helical conveying surface moving relative to the boundary surface and adapted to move solids toward the solids outlet, settling with centrifugal force the cheese curd against the boundary surface by high speed rotation of the latter, and moving the settled cheese solids by the conveying surface toward the solids outlet, discharging the solids comprising the cheese product from the solids outlet without recirculation of any appreciable portion thereof to the centrifuge, and discharging the whey from the liquid outlet.

2. A process as described in claim 1 wherein the liquid outlet is closer to the axis of the zone of centrifugation than the solids outlet.

3. A process as described in claim 1 wherein the heating is accomplished rapidly and uniformly while the curd and whey are in motion.

4. A process as described in claim 1 wherein the temperature is at least 110° F.

5. In a process for making bakers' cheese following the formation of cheese curd and whey, the steps of heating a stream of the cheese curd with its whey to a selected temperature in the range of between 95° and 160° F. depending on the moisture content desired in the final cheese product, delivering the stream continuously to an axially elongated annular zone of centrifugation extending about an axis, separating the cheese and curd and whey with centrifugal force to form an outer or boundary annular layer of cheese curd and an inner layer of whey within said zone, withdrawing the cheese curd from the formed outlet layer within said zone by moving the curd longitudinally of said zone with a helical conveyor surface movable relative to a solids discharge outlet and discharging therethrough without recirculation of any appreciable portion thereof to said zone, and withdrawing the whey from the formed inner layer within said zone by discharging through a liquid outlet axially spaced from said solids outlet.

6. A process as described in claim 5 wherein the liquid outlet is closer to the axis of the zone of centrifugation than the solids outlet.

7. A process as described in claim 5 wherein the heating is accomplished rapidly and uniformly while the curd and whey is in motion.

8. A process as described in claim 5 wherein the temperature is at least 110° F. and approaches 160° F. to effect pasteurization of the cheese products.

References Cited

UNITED STATES PATENTS

| | | | |
|---|---|---|---|
| 2,712,999 | 7/1955 | Strezynski | 99—116 |
| 3,148,145 | 9/1964 | Reed | 233—7 |
| 3,172,851 | 3/1965 | Ambler | 233—7 |

A. LOUIS MONACELL, *Primary Examiner.*

D. M. NAFF, *Assistant Examiner.*

U.S. Cl. X.R.

31—89; 99—243